Feb. 12, 1957 E. J. FREY 2,781,060
FLOW CONTROLLER
Filed Jan. 8, 1954

INVENTOR.
Edward J. Frey
BY
His Attorney

United States Patent Office 2,781,060
Patented Feb. 12, 1957

2,781,060

FLOW CONTROLLER

Edward J. Frey, Dayton, Ohio, assignor to General Motors Corporation, Detroit, Mich., a corporation of Delaware Application January 8, 1954, Serial No. 402,946

1 Claim. (Cl. 138—46)

This invention relates to domestic appliances and more particularly to a fluid controller such as for supplying water to an automatic washing machine at a substantially constant rate from a supply having a varying head pressure.

An object of this invention is to provide a controller of the above characteristics, which may be manufactured without high tool costs, and by simple manufacturing operations.

Further objects and advantages of the present invention will be apparent from the following description, reference being had to the accompanying drawings, wherein a preferred form of the present invention is clearly shown.

Figure 1:
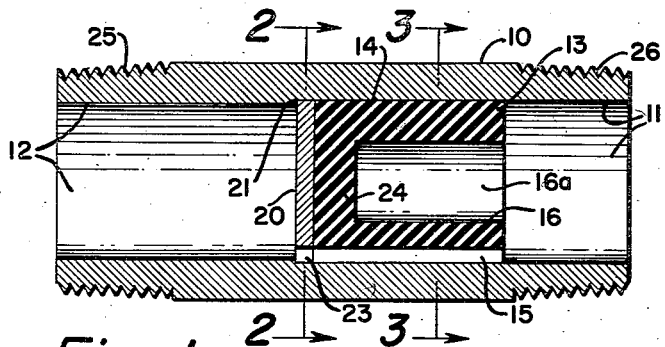
Figure 1 is a longitudinal vertical cross-section of the controller taken along the line 1—1 of Figure 2.

A controller embodying my invention may include a solid outer tube 10 having inner inlet and outlet surfaces 11 and 12. An inner flexible tube 13 is placed within the solid tube 10. The flexible tube has an outer surface 14 with longitudinally directed grooves 15. The outer surface 14 is in contact with the inner surface 11 between the grooves 15.

Means are associated with the tubes 10 and 13 to cause high velocity flow of fluid through the grooves 15 and a static fluid head pressure within the cavity 16a surrounded by inner surface 16 of the flexible tube 13. To this end, a structure is provided which prevents the flow of fluid past the downstream end of the cavity 16a, but permits free flow of fluid through the grooves 15. A disk 20 is press-fitted against the shoulder 21 between the surfaces 11 and 12. The disk 20 is provided with fingers 22 forming grooves 23, which grooves are aligned with the grooves 15 of the tube 13. After the disk 20 has been fitted in the tube 10, the flexible tube 13 is inserted, with the grooves 15 and 23 in aligned position. The tube 16 is provided with an end wall 24 which prevents the flow of fluid from the cavity 16a to the outlet 12.

If desired, the outer surface of the tube 10 is threaded at 25 and 26, so that the controller may be placed between the usual solenoid-thermostat water controller and the washing machine, somewhat as diagrammatically indicated in my application for domestic appliances, Serial No. 402,944, filed January 8, 1954, which is filed concurrently herewith.

Figure 2:
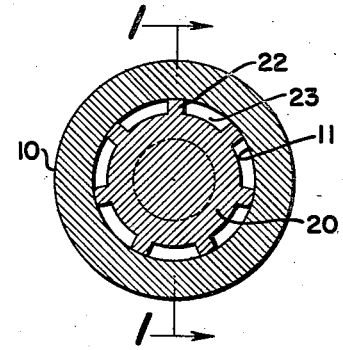
Figure 2 is a transverse cross-section taken along line 2—2 of Figure 1.
Figure 3:
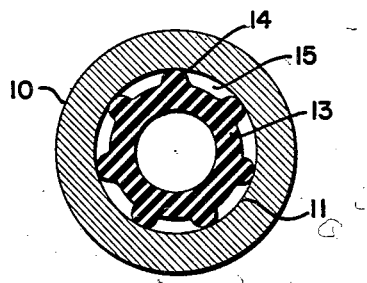
Figure 3 is a transverse cross-section taken along the line 3—3 of Figures 1 and 4.
Figure 5:
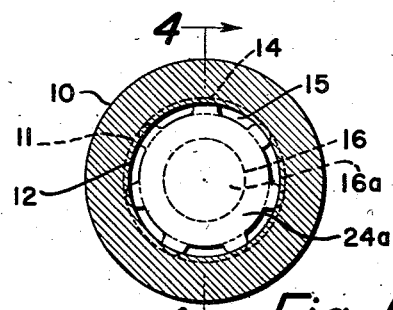
Figure 5 is a transverse cross-section taken along the line 5—5 of Figure 4.
Figure 4:
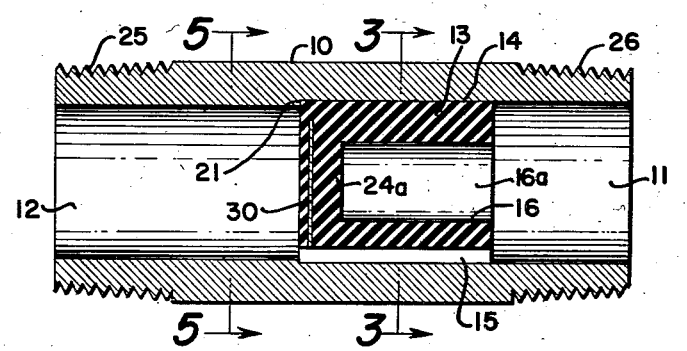
Figure 4 is a view similar to Figure 1 of a modified form.

In the modification shown in Figures 4 and 5, the parts which are identical with those shown in Figures 1, 2 and 3 are numbered with the same numbers. The difference lies in the fact that disk 20 has been omitted in Figures 4 and 5, and in lieu thereof a reinforcement 30 has been embedded in the end wall 24a. The tube 13 in Figure 4 may be pressed into the solid tube 10 and against the shoulder 21 without first inserting any disk. The reinforcement 30 prevents any bulging of the end wall 24a. Other parts of Figures 4 and 5 that are substantially identical with similar parts of Figures 1, 2 and 3 are similarly numbered and operate in the same manner.

In the operation of the controller, water or any other fluid under varying head pressure enters at the inlet 11, passes through the grooves 15 and 23 (or grooves 15 only, in Figures 4 and 5) and out the outlet 12 to the washing machine or the like. At the same time, the water under static head pressure enters the cavity 16a inside the inner surface 16 and exerts a static head pressure radially towards the grooves 15. The static head pressure at surface 16 is stronger than the pressure within the grooves 15 since part of the head pressure in the grooves 15 is a kinetic velocity head. Under these conditions, the walls of the flexible tube 13 are flexed slightly towards the grooves 15. Since the degree of this flexing varies in proportion to the head pressure at 11 and 16, a greater restriction is produced with a greater head pressure. This tends to iron out any variations in the discharge rate at 12, so that it is substantially constant or has such slight variations that the amount of water being fed to the washing machine may be measured by the timer, without the necessity of a float control.

The size of the grooves 15 and the thickness and flexibility of tube 13 may be calibrated to obtain any desired flow at outlet 12 under varying fluid head pressures at inlet 11.

While the form of embodiment of the invention as herein disclosed constitutes a preferred form, it is to be understood that other forms might be adopted, as may come within the scope of the claim which follows.

What is claimed is as follows:

A controller adapted to be interposed in a fluid line for maintaining a substantially constant rate of flow in said line irrespective of varying head pressure comprising, a rigid tubular member having a passageway extending therethrough, the upstream portion being larger than the downstream portion to form a circular shoulder intermediate the ends of said passageway, an annular supporting disk abutting said shoulder, and a resilient flow control member fitting within said passageway having an end portion abutting said supporting disk, said resilient member comprising a substantially hollow cylindrical central chamber of uniform diameter throughout its length extending part-way therethrough and with its open end facing the inlet side of said rigid member, a plurality of straight longitudinally extending circumferentially spaced ribs formed integral with said resilient member in line contact with the inner surface of said passageway, said ribs being joined by integral arcuate portions that are spaced from said inner surface to form straight longitudinally directed circumferentially spaced grooves between said ribs, said arcuate portions moving outwardly toward said passageway surface to restrict flow through said grooves when fluid pressure is applied to said resilient member central chamber, said supporting disk being formed with ribs and arcuate portions matching the ribs and arcuate portions of said resilient member and abutting the entire end area of said resilient member.

References Cited in the file of this patent

UNITED STATES PATENTS

| | | |
|---|---|---|
| 1,879,197 | Greenwald | Sept. 27, 1932 |
| 2,506,152 | Hunter | May 2, 1950 |
| 2,644,476 | Smith | July 7, 1953 |